A. HAMMERSTEIN.
TIMING DEVICE.
APPLICATION FILED MAR. 29, 1910.
1,014,703.
Patented Jan. 16, 1912.
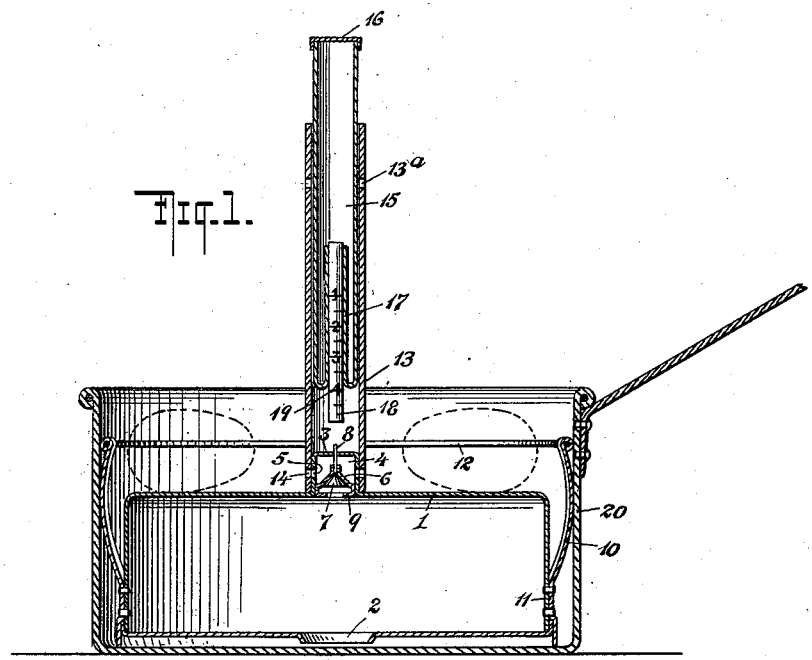
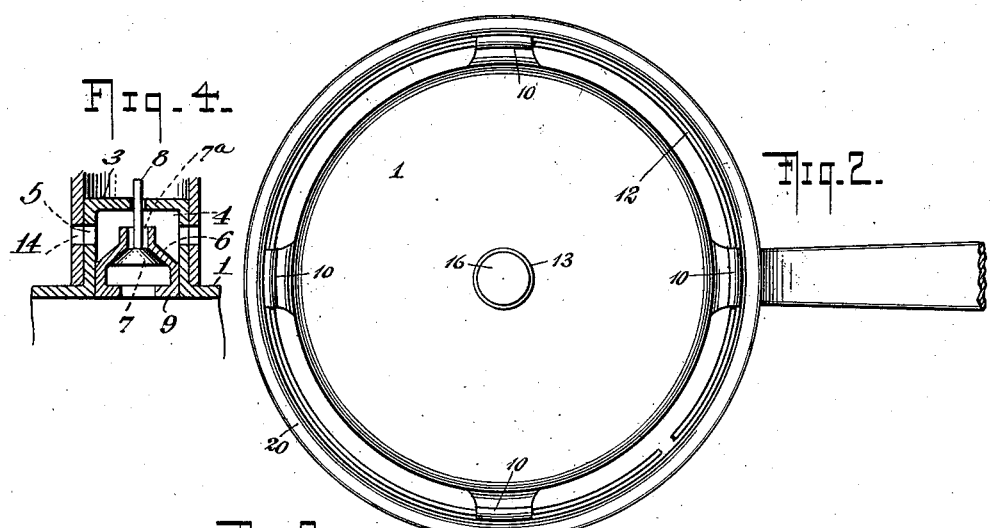
WITNESSES:
INVENTOR
Arthur Hammerstein
BY
ATTORNEY

UNITED STATES PATENT OFFICE.

ARTHUR HAMMERSTEIN, OF NEW YORK, N. Y.

TIMING DEVICE.

1,014,703.

Specification of Letters Patent. Patented Jan. 16, 1912.

Application filed March 29, 1910. Serial No. 552,243.

*To all whom it may concern:*

Be it known that I, ARTHUR HAMMERSTEIN, a citizen of the United States, and resident of the borough of Manhattan, city, county, and State of New York, have invented certain new and useful Improvements in Timing Devices, of which the following is a specification.

My invention relates to devices for timing the cooking or boiling of certain foods particularly eggs and has for its object to provide a device of this character in which the boiling fluid will be withdrawn from the food after a predetermined period of time has passed thus leaving the said food free from the influences of said boiling fluid.

A further object of my invention is to provide a means by which said device may be adjusted to cover varying periods of time for different cooking purposes.

My invention will be fully described hereinafter and the features of novelty will be pointed out in the appended claims.

Reference is to be had to the accompanying drawings in which—

Figure 1 is a central sectional view of my improved device showing it in position in a cooking vessel; Fig. 2 is a plan view thereof; Fig 3 is a perspective view of a slightly different form of my invention and Fig. 4 is an enlarged detail view of a valve and seat used in my invention.

My improved timing device comprises a receptacle 1 which has an opening 2 located in its bottom and at its upper portion is provided with an upwardly extending neck 3 forming a valve chamber 4 which is connected with the atmosphere through the medium of apertures 5 formed in the vertical walls of said neck 3. A valve seat 6 is located in the chamber 4 for the accommodation of a valve 7 controlling a passage 7ª which establishes communication between the interior of the receptacle 1 and the chamber 4. The said valve 7 is provided with an upwardly extending stem 8 which projects through and beyond the upper horizontal wall of the chamber 4. An annular inwardly extending flange 9 is formed at the lower portion of the chamber 4 and serves to limit the downward movement of the valve 7 and prevent its complete removal from the valve chamber 4. The valve seat 6 and flange 9 preferably form parts of a single separate structure which is slipped into the lower portion of the chamber 4 and is maintained therein by means of solder or merely by friction. The receptacle 1 is provided at intervals on its outer periphery with resilient arms 10 which are secured to the receptacle at 11 by rivets or otherwise and which extend downwardly beyond the bottom of said receptacle to form rests or supports therefor. The said arms 10 further extend upwardly beyond the top of said receptacle and have their free ends connected by means of a split ring 12 which together with the top of the receptacle forms a basket or container for the food to be boiled or cooked.

A tube 13 provided near its upper end with an opening 13ª is arranged to be slipped over and supported in an upright position by the neck 3 and is provided near its lower end with apertures 14 adapted to register with the apertures 5 in said neck as clearly shown in Fig. 1. A plunger 15 which may be tubular is slidably mounted in the tube 13 and is of a slightly smaller diameter than said tube 13 so as to be capable of a sliding movement relatively thereto. The upper end of said plunger 15 if the same is tubular as shown is closed by a removable cap 16. At its lower end the plunger is provided with an inwardly extending tube 17 of smaller diameter than that of the plunger 15 and accommodating a rod 18 slidably mounted and frictionally held therein and having indicating marks 19 produced on its periphery. This rod 18 extends axially of said tube 15 and is arranged, under certain conditions, to be more fully explained hereinafter, to engage with the stem 8 of the valve 7.

In operation, if for instance, it is intended to boil eggs a certain number of minutes, the vessel 20 containing the water is first placed on the fire to bring the water to the boiling point. In the meantime the plunger 15 is removed from the tube 13 and the rod 18 withdrawn from or moved into the tube 17 the required distance, that is until the mark indicating the time it is desired to boil the eggs registers with the bottom of the tube 15. Thus if it is desired to boil the eggs four minutes the rod is moved inwardly until the indication four registers with the bottom of the plunger 15 as shown in Fig. 1. Water is now introduced into the tube 13 up to the point at which the aperture 13ª is located, it being understood that the connection between the neck 3 and the tube 13 is water tight so that the horizontal top of the said neck 3 forms the bottom of the tube 13 and maintains the water therein. If the water in the vessel has now begun to boil, the eggs are placed in the basket or container formed by the arms 10, ring 12 and top of receptacle 1, which receptacle is then plunged into the boiling water and forced down in the vessel until the lower ends of the arms 10 engage with the bottom of said vessel. In this position the receptacle is supported in the vessel with its bottom spaced from the bottom of said vessel and is maintained in this position by the frictional engagement of the resilient arms 10 with the walls of the vessel 20, the pressure of these arms being sufficient to overcome the tendency of the liquid to raise the said receptacle. As the receptacle is thus placed in position in the boiling water the air contained therein will be compressed by the water and will force the valve 7 against its seat. This compressed air will thus form a cushion to prevent the water from entering the said receptacle. As soon as the receptacle has been thus placed in position in the vessel 20, the plunger 15 is inserted into the tube 13 and immediately begins to descend, this descent being slow owing to the resistance of the water contained in the tube 13. As the said plunger thus descends the water will be displaced thereby and will pass between the plunger 15 and tube 13 out of the aperture 13ª into the cooking vessel and the end of the rod 18 will finally engage the stems and will open the valve 7. As the valve 7 is thus opened the air contained in the receptacle 1 will escape through the apertures 5 and 14 and the water in the vessel or most of it will rush into the said receptacle 1 through the opening 2 and leave the eggs free therefrom. The receptacle 1 with the boiled eggs thereon may now be removed and the operation repeated.

It is of course to be understood that there is sufficient water in the vessel 20, to cover the eggs when the receptacle is placed in position therein and further that the receptacle 1 is of sufficient capacity to receive enough of the water when the valve 7 is opened to positively uncover the eggs or other food being timed.

It is to be further understood that the time it takes the plunger 15 to descend in the tube 13 coupled with the position of the rod 18 corresponds to the length of time it is intended to boil the food so that the end of said rod 18 will contact with the valve stem and open the valve the moment this predetermined period of time has elapsed.

It will readily be seen that the more the rod 18 is withdrawn from the tube 17 the less time will elapse before the end thereof contacts with the stem 8 of the valve 7 and vice versa, the more the said rod is moved inwardly the greater the period of time which will pass before the valve 7 is opened.

Instead of filling the tube 13 with water to retard the descent of the plunger 15, the said plunger may be made to fit the tube 13 sufficiently snug so that the air contained in said tube will offer a sufficient resistance to prevent the plunger from descending too quickly. Instead of this particular means for operating the valve 7 other means may be substituted it being only necessary that said valve is opened after a predetermined space of time has passed. The essential feature of my invention is the receptacle 1 with its valve and container for the food to be cooked.

In Fig. 3, I have shown a different form of resilient arms. In this form the said arms are formed of a single piece of wire or other suitable material 21 bent to proper shape and secured to the receptacle 1 by means of lips or lugs 22. In this construction the wire forming the said arms is also bent to form the split ring 23 so that the arms and ring are contiguous and in one piece. In both forms of my invention these arms have a sufficient scope of resilient operation to adapt the said receptacle for use in connection with cooking receptacles of varying sizes, it being understood that the pressure of these arms against the walls of the vessel is always sufficient to overcome the natural tendency of the water to lift said receptacle. The split ring in each case permits said arms to accommodate themselves properly to the size of the cooking vessel.

With my improvement the water is thus easily and quickly removed from the food in the container so that said food is left free from its influences and properly cooked as desired after the predetermined interval of time has elapsed. It is unnecessary in my structure therefore to depend on spring operated or other mechanism to raise the container and food out of the water, thus doing away with the danger of such complicated mechanism becoming disarranged and inoperative at an inopportune time. The actual mechanism, that is the valve and plunger on which the operativeness of my device depends, is of such a simple nature as not to easily be disarranged or disturbed.

Various changes may be made in the specific construction shown and described within the scope of the claims without departing from the spirit of my invention.

I claim:

1. The combination of a container for a liquid, a receptacle in said container having two apertures and arranged to contain a pressure medium adapted to control the entrance of the liquid in said container through one aperture and means for normally closing the other aperture maintained in position by the action of the pressure medium and arranged to be operated against the action of said pressure medium to open said last aperture and permit the pressure medium to escape and the said liquid to freely enter said receptacle after a predetermined period of time has elapsed.

2. The combination of a container for a liquid, a receptacle in said container having two apertures and arranged to contain a pressure medium adapted to control the entrance of the liquid in the container through one aperture, means for normally closing the other aperture and an adjustable device carried by said receptacle for operating said means to open said last aperture and permit the pressure medium to escape and the said liquid to freely enter said receptacle after a predetermined period of time has elapsed.

3. The combination of a container for a liquid, a receptacle in said container having two apertures and arranged to contain a pressure medium adapted to control the entrance of the liquid in the container through one aperture, a valve for closing the other aperture and means carried by said receptacle for opening said valve to permit the pressure medium to escape and the said liquid to freely enter said receptacle.

4. The combination of a receptacle provided with openings, a cylinder carried by said receptacle, a valve controlling one of said openings, and a plunger in said cylinder arranged to open said valve after a predetermined period of time has elapsed.

5. The combination of a receptacle provided with openings, a valve controlling one of said openings, and a plunger and adjustable means on said plunger arranged to open said valve after a predetermined period of time has elapsed.

6. The combination of a receptacle adapted to contain a pressure medium and provided with openings, means for normally closing one of said openings, a device for actuating said means after a predetermined period of time has elapsed to free said one opening and relieve the pressure in the receptacle and adjustable means on said actuating device for varying the point at which said device operates.

7. The combination of a receptacle adapted to contain a pressure medium and provided with openings, means for normally closing one of said openings, a plunger for actuating said means after a predetermined period of time has elapsed to free said one opening and relieve the pressure in said receptacle and a slidable device on said plunger for varying its operative length.

8. The combination of a container for a liquid, a receptacle in said container having two apertures and arranged to contain a pressure medium adapted to control the entrance of the liquid in the container through one aperture, means for normally closing the other aperture maintained in position by the action of the pressure medium and arranged to be operated against the action of said pressure medium to open said last aperture and permit the pressure medium to escape and the said liquid to freely enter the said receptacle, and means for removably securing said receptacle in the container.

9. The combination of a container for a liquid, a receptacle in said container having two apertures and arranged to contain a pressure medium adapted to control the entrance of the liquid in the container through one aperture, means for normally closing the other aperture and arranged to be operated to open said last aperture and permit the pressure medium to escape and the said liquid to freely enter the said receptacle and resilient arms for securing said receptacle in said container.

10. The combination of a container for a liquid, a receptacle in said container having two apertures and arranged to contain a pressure medium adapted to control the entrance of the liquid in the container through one aperture, means for normally closing the other aperture and arranged to be operated to open said last aperture and permit the pressure medium to escape and the said liquid to freely enter the said receptacle and resilient means projecting above said receptacle to form a holder for the food and to removably secure said receptacle in the container.

11. The combination of a container for a liquid, a receptacle in said container having two apertures and arranged to contain a pressure medium adapted to control the entrance of the liquid in the container through one aperture, a valve for closing the other aperture, a cylinder carried by said receptacle and a plunger in said cylinder for operating said valve to permit the pressure medium to escape and the said liquid to freely enter said receptacle.

In testimony whereof I have hereunto set my hand in the presence of two subscribing witnesses.

ARTHUR HAMMERSTEIN.

Witnesses:
   JOHN A. KEHLENBECK,
   G. V. RASMUSSEN.